Oct. 19, 1954  P. F. ROSSMANN  2,692,162
DUAL DRIVE FOR TOP-LIFT MECHANISMS
Filed Feb. 4, 1952
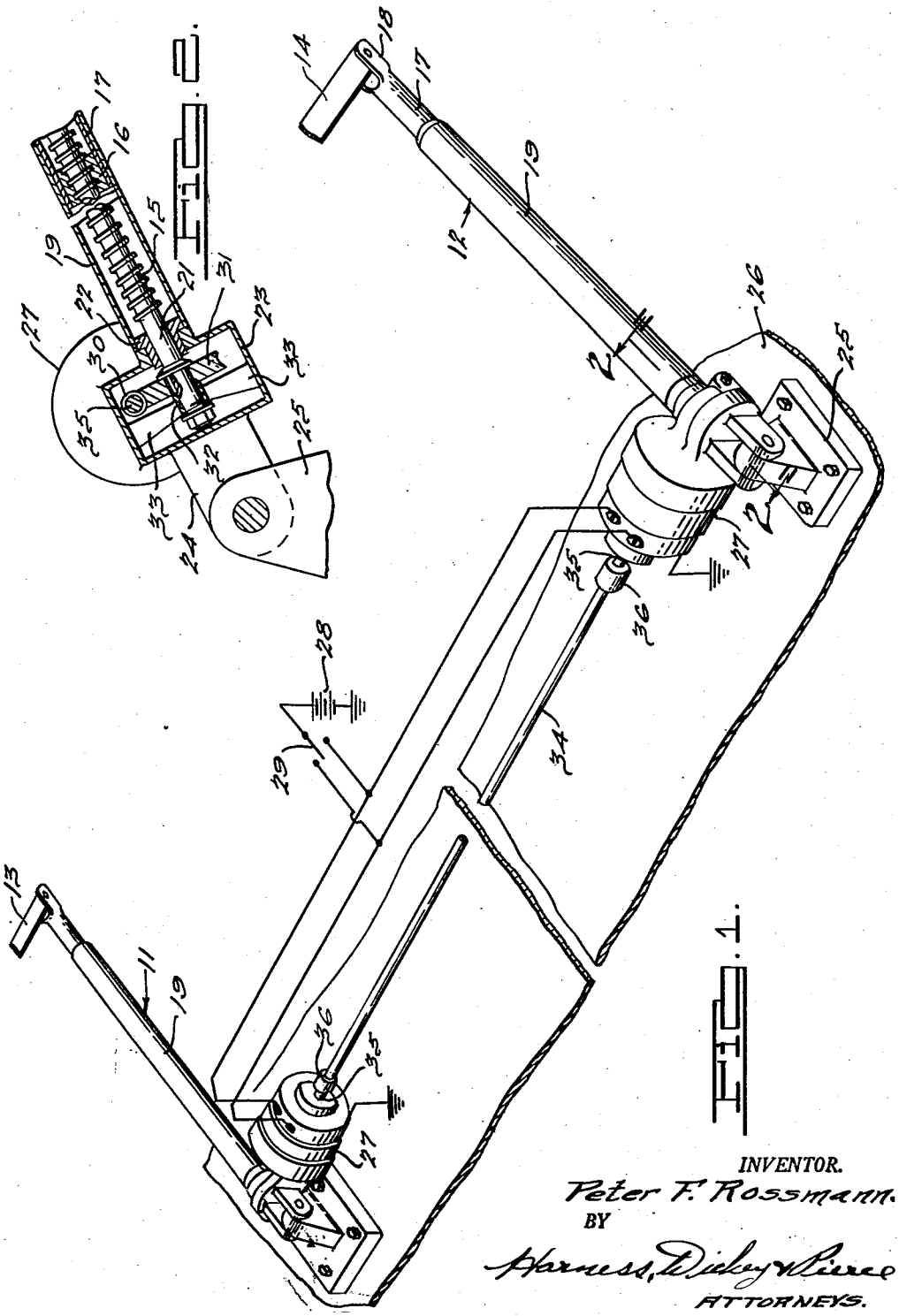
INVENTOR.
Peter F. Rossmann.
BY
Harness, Dickey & Pierce
ATTORNEYS.

Patented Oct. 19, 1954

2,692,162

UNITED STATES PATENT OFFICE 2,692,162

DUAL DRIVE FOR TOP-LIFT MECHANISMS

Peter F. Rossmann, Grosse Pointe Farms, Mich., assignor to Hupp Corporation, Cleveland, Ohio, a corporation of Virginia Application February 4, 1952, Serial No. 269,754

1 Claim. (Cl. 296—117)

This invention relates to vehicle top-lift mechanisms, and more particularly to actuators for driving the linkage which operates a folding vehicle top of the type used in convertibles and the like.

In the past, one of the problems encountered in providing actuating means for vehicle folding-top linkages has been that of insuring the even and co-ordinated movement of the two sides of the linkage so as to prevent the danger of damage to the top or jamming of the linkage should one side be moved at a substantially different rate than the other. Another problem to be overcome in providing top-lift actuators is that of insuring sufficient power at all times to actuate both sides of the unit, at the same time insuring an even distribution of this total available power.

It is an object of the present invention to meet the above problems and to provide a top-lift actuating means which insures substantial power to both sides of the linkage and at the same time obviates the danger of one side of the linkage moving at a different rate than the other side.

It is another object to provide an improved top-lift actuator of the above nature which utilizes separate power actuating means for each side of the linkage and in which these separate units are interlocked in such manner as to positively insure their constant balance in driving the top-lift linkage.

It is a further object to provide an improved top-lift actuator having the above characteristics which is especially adapted for top-lift mechanisms having pivoted reduction gear housings and electric motors mounted on said housings.

Other objects, features, and advantages of the present invention will become apparent from the subsequent description taken in conjunction with the accompanying drawing.

In the drawing:

Figure 1 is a perspective view of the improved top-lift actuating means of this invention showing the interlocking shaft between the driving motors and with a schematic showing of the electrical circuit; and Figure 2 is a fragmentary cross-sectional view in elevation taken along the line 2—2 of Figure 1 and showing the construction of the reduction gearing and screw shaft.

Although the invention is shown as embodied in a convertible top-lift actuating means, it will be understood that the principles of the invention could be embodied in other types of actuating mechanisms having operational requirements similar to that of top-lift linkages. The invention consists essentially of a pair of extensible and retractable actuating elements disposed on opposite sides of an automotive vehicle, which are connected to the proper points on the two sides of a conventional top-lift linkage assembly. These extensible and retractable elements, which in themselves may be of conventional construction, are powered by separate electric motors, each motor being connected by reduction gearing to its individual actuating element. The electric motors are preferably connected to the same power source, for example, the battery of the vehicle; and being of the same type and size, these motors will normally deliver approximately the same power output and run at the same speed. However, due to the manufacturing tolerances and other variations inherent in motors of this type, which are of relatively inexpensive construction, it is likely that the motors will vary in speed or will tend to heat at different rates, thus varying their electrical characteristics. A result of this variation will be that one motor will drive its actuating unit at a different rate than the other, thereby folding or unfolding the top-lift linkages at different rates. The result will be the eventual binding or jamming of the linkages or damage to the convertible top itself.

To prevent this result, the invention provides an interlocking member connected between the two individual electric motors, this member preferably taking the form of a rigid shaft secured between the individual motor armature shafts. This interlocking shaft serves to continually lock the two motors in phase, and prevents any differential in shaft speeds. The interlocking shaft does not serve to transmit substantial power between the motors but acts primarily to lock the motors in synchronism and in phase to insure the even movement of the two sides of the linkage.

Referring more particularly to the drawing, the two extensible and retractable actuating elements are indicated at 11 and 12, these elements being connected to links 13 and 14 respectively which are part of a conventional folding top linkage (not shown) for an automotive vehicle. Each extensible and retractable element comprises a rotatable screw shaft 15 on which is rotatably mounted a traveling nut 16. A sleeve 17 secured to this nut extends concentrically with the screw 15, the outer end of sleeve 17 being pivotally connected to its corresponding linkage by forked end 18. A dust-protecting cylindrical shield 19 preferably surrounds the screw 15 so as to prevent the collection of dirt when the sleeve 17 is extended. The inner end 21 of screw 15 is rotatably supported by a bushing 22 held by a reduction gear housing 23. This housing is pivotally connected by lugs 24 to a stationary bracket 25 secured to the deck 26 of the vehicle. It will be understood that the construction of such a screw-type actuator is more or less conventional and in itself forms no part of the present invention.

Each housing 23 has secured thereto a reversible electric motor 27. The motors 27 are duplicates and of any conventional type such as a shunt or series wound D. C. construction, and are adapted to be connected to a common source of power such as battery 28 and manual reversing switch 29. It will be understood that the electrical circuit shown is merely illustrative and that other means such as relays may be used in the circuit. Reduction gearing in the form of a worm 30 meshing with a worm wheel 31 secured to screw shaft 15 serves to drive the actuating mechanism, and the end of the screw shaft may be further supported by an inner bearing 32 held by struts 33.

It will be observed that the provision of two separate electric motors for the two sides of the linkage will insure sufficient power at all times to drive the top between its open and closed positions, and in this respect the unit is more advantageous than installations using only a single motor to drive both sides of the linkage. Interconnecting the electric motors is an interlocking member 34 which preferably comprises a rigid shaft extending across the vehicle. This shaft is connected to the armature shafts 35 of the motors by means of coupling 36, which may be of a flexible nature in a lateral direction but are preferably of limited flexibility in a torsional direction. The interlocking shaft 34 thus acts to unite the two armature shafts 35, preventing rotation of one shaft at a different rate than the other.

The operation of the device will be apparent from the foregoing description. Upon energization of motors 27, these motors will normally drive the extensible and retractable actuating elements 11 and 12 at the same rate of speed. If such is the case, no power will be transmitted through interlocking shaft 34. Should, however, one of the motors 27 tend to drive at a faster rate than the other, there will be a resultant torsional force in shaft 34 which will be transmitted to the other motor 27, traveling momentarily at a slower speed. The amount of this torsional force will be relatively slight, since it will represent only the difference between the power outputs of the two motors. This force will serve to speed up the slower motor and thus keep it in proper synchronism with its counterpart. Simultaneously, the reaction caused by this differential torsional force will act upon the faster motor, tending to slow it down. The result of this action and reaction transmitted by the interlocking shaft will be that both elements 11 and 12 will extend or retract at the same rate of speed, and the two sides of the top-lift linkage will therefore fold or unfold in synchronized relation. It will be noted that the presence of the interlocking shaft 34 in no way interferes with the rocking movement of the actuators, since the shaft will merely be carried bodily between the motors 27 as the actuators move.

While it will be apparent that the preferred embodiment of the invention herein disclosed is well calculated to fulfill the objects above stated, it will be appreciated that the invention is susceptible to modification, variation, and change without departing from the proper scope or fair meaning of the subjoined claim.

What is claimed is:

Actuating means for an automotive top lift linkage including a pair of oppositely disposed extensible and retractable actuators, means for pivotally securing one end of each actuator to the vehicle body at one side thereof, said actuators being pivotable about said securing means in planes substantially parallel to the vehicle center line, means for operatively connecting the other end of each actuator to the corresponding side of the top lift linkage, a gear housing at the end of each actuator adjacent said pivotal securing means, a reversible electric motor secured to each of said housings on the side toward the vehicle center line, means for simultaneously energizing said motors, gearing in said housings connecting each motor with its corresponding actuator, and a substantially rigid interlocking shaft extending normally to the vehicle center line between said motors and secured to the armature shafts thereof, said interlocking shaft serving to transmit only the differential torsional forces between said motors, whereby the motors are locked in synchronism.

References Cited in the file of this patent

UNITED STATES PATENTS

| Number | Name | Date |
|---|---|---|
| 1,996,595 | Smith | Apr. 2, 1935 |
| 2,230,140 | Falcon | Jan. 28, 1941 |
| 2,329,802 | Westrope | Sept. 21, 1943 |
| 2,376,949 | Westrope | May 29, 1945 |
| 2,580,486 | Vigmostad | Jan. 1, 1952 |

FOREIGN PATENTS

| Number | Country | Date |
|---|---|---|
| 582,035 | Germany | Aug. 7, 1933 |